United States Patent
Song

(10) Patent No.: US 7,133,801 B2
(45) Date of Patent: Nov. 7, 2006

(54) SYSTEM AND METHODOLOGY FOR VIBRATION ANALYSIS AND CONDITION MONITORING

(75) Inventor: Limin Song, West Windsor, NJ (US)

(73) Assignee: Exxon Mobil Research and Engineering Company, Annandale, NJ (US)

(*) Notice: Subject to any disclaimer, the term of this patent is extended or adjusted under 35 U.S.C. 154(b) by 0 days.

(21) Appl. No.: 11/033,927

(22) Filed: Jan. 12, 2005

(65) Prior Publication Data

US 2005/0209814 A1    Sep. 22, 2005

Related U.S. Application Data

(63) Continuation-in-part of application No. 10/439,959, filed on May 16, 2003, now Pat. No. 7,031,873.

(60) Provisional application No. 60/387,274, filed on Jun. 7, 2002.

(51) Int. Cl.
 G01P 3/00    (2006.01)
(52) U.S. Cl. .................................... 702/145
(58) Field of Classification Search ............... 702/145, 702/199; 708/445, 805
See application file for complete search history.

(56) References Cited

U.S. PATENT DOCUMENTS

| | | | |
|---|---|---|---|
| 3,815,426 A | 6/1974 | Ronner | |
| 5,109,700 A | 5/1992 | Hicho | |
| 5,115,671 A | 5/1992 | Hicho | |
| 5,627,762 A | 5/1997 | Cameron et al. | |
| 5,646,340 A | 7/1997 | Gee et al. | |
| 5,744,723 A | 4/1998 | Piety | |
| 5,747,833 A | 5/1998 | Fujisaki et al. | |
| 5,831,178 A | 11/1998 | Yoshimura et al. | |
| 5,895,857 A * | 4/1999 | Robinson et al. | ............. 73/660 |
| 6,087,796 A | 7/2000 | Canada et al. | |

FOREIGN PATENT DOCUMENTS

| | | |
|---|---|---|
| EP | 0 775 894 A2 | 5/1997 |
| JP | 403007081 A | 1/1991 |
| JP | 404208199 A | 7/1992 |
| JP | 363140963 A | 6/1998 |

* cited by examiner

*Primary Examiner*—Michael Nghiem
*Assistant Examiner*—Tung S. Lau
(74) *Attorney, Agent, or Firm*—Glenn T. Barett

(57) ABSTRACT

A system and methodology for continuous condition monitoring of rotating equipment. Employ adaptive signal processing techniques to determine the RPM of a rotating machine from time-based vibration data. RPM is determined based upon the input of a digitized time-based sample sequence of vibration data acquired directly from a vibration transducer for on-line real-time measurement of the machine RPM. Once RPM is determined, online vibration analysis for a given RPM or set of RPMs may be performed. The present invention extracts characteristic vibration features from vibration data and uses these extracted values to provide condition detection and diagnoses of machine faults.

18 Claims, 14 Drawing Sheets

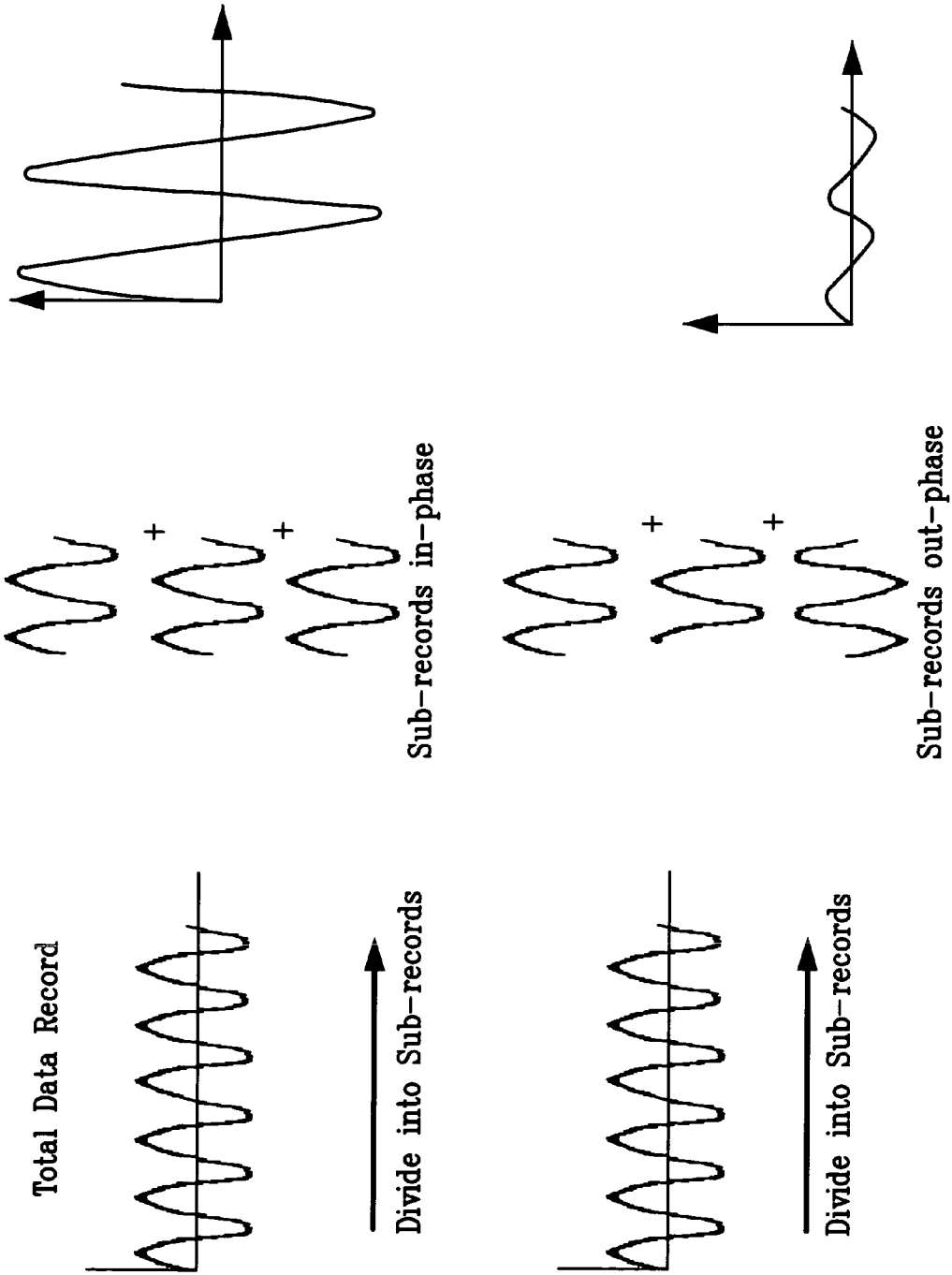

SYSTEM AND METHODOLOGY FOR VIBRATION ANALYSIS AND CONDITION MONITORING

CROSS REFERENCE TO RELATED APPLICATIONS

This application is a continuation-in-part application of a patent application entitled "Virtual RPM Sensor", application Ser. No. 10/439,959, filed on 16 May 2003 now U.S. Pat. No. 7,031,873 and claims priority to provisional application Ser. No. 60/387,274 filed on Jun. 7, 2002, and the contents of each are hereby incorporated by reference in their entirety.

FIELD OF THE INVENTION

The present invention relates generally to the analysis of rotating machines and more particularly to techniques for determining operating faults present in such machines.

BACKGROUND OF THE INVENTION

As manufacturing and processing requirements become more and more complex, today's plants and other manufacturing and processing facilities contain more and more machines and other complex mechanical components and devices of all sizes and shapes and for an exceedingly large variety of applications. For example, in a typical petroleum refinery or other chemical plant, hundreds or even thousands of machines may exist in connection with the various processes being performed at the particular facility.

These machines may include compressors, turbines, pumps, motors, fans and other devices that employ some manner of rotation in connection with their operation. In order to maintain, troubleshoot and otherwise operate these machines over time, it is often important to obtain relatively frequent RPM (rotations per minute) readings with respect to the rotational elements of the machines. These RPM readings can be used to diagnose many problems with the machines that are not readily apparent to the naked eye or are otherwise difficult or impossible to ascertain without the aid of the RPM readings. For example, significant deviations in RPM speed from that which is called for in the machine specification may indicate the existence of an operational problem. Also, significant deviation from the past characteristic operating RPM speed for a particular machine may signal that some form of maintenance or repair is required. As yet another example, known operational problems may be suspected based upon vibration information as the vibration frequency spectrum of the machine relates to the rotational speed of the machine. The presence of excessive vibration levels at certain frequencies, known as defect or fault frequencies, usually indicates a specific machine fault or operational problem. For example, a high vibration at a frequency of 1×RPM may be caused by an unbalance of the machine shaft. The defect frequencies are directly related to the machine speed as multiples of RPM.

In order to properly make such diagnoses, it is quite important for the RPM readings to be accurate, because improper or inaccurate RPM readings can lead to the false belief that a problem exists when one actually does not or, alternatively, the false belief that a problem does not exist when, in fact, one actually does. Additionally, inaccurate RPM readings can lead to misdiagnosis of a machine problem. High accuracy of RPM readings is particularly important when high frequency vibration components are used to detect problems associated with rotating elements of bearings because a small error in RPM readings will be amplified at high frequencies.

There are various prior art methods for obtaining RPM readings for rotating machines. One common technique is to directly measure rotational speed by installing an RPM sensor, commonly known as a "Key Phaser" or a "Tachometer", on the machines. Unfortunately, these RPM sensors are quite difficult to install on existing machines. Further, the sensors are quite expensive and given the large numbers of machines in typical plants, which can number in the thousands, the costs can be prohibitive. It is for this reason that direct speed sensor measurement is often limited to a few critical machines such as major process compressors in a refinery application.

Another method for obtaining RPM readings which is currently in use is through a high-resolution Fast Fourier Transform (FFT) analysis of the vibration signals in order to arrive at an estimate for the RPM value. This method, however, typically requires an operator to interpret the FFT spectrum and is not, therefore, suitable for automatic on-line vibration analysis. Notwithstanding this, as low-cost data acquisition systems are being made commercially available on a broader basis, plants have begun to implement on-line vibration monitoring systems on machines which are not mission critical such as, for example, pumps and motors. These vibration monitoring systems are usually equipped with only vibration sensors and not with speed sensors because of cost constraints. Further, the majority of low-cost on-line vibration monitoring systems are not capable of providing high-resolution FFT vibration analysis. Without direct RPM sensors, the vibration monitoring systems currently in use are relatively inaccurate in terms of providing RPM readings.

There have been attempts to provide more accurate RPM readings based upon vibration analysis techniques. However, many of these techniques still suffer from drawbacks including inaccuracy in RPM readings. In particular, these techniques often result in inaccurate readings especially when the noise associated with the vibration readings is high—a common situation in most plant applications. For example, M. D. Hicho discloses a method for determining the RPM of a rotating machine from a vibration frequency spectrum (see U.S. Pat. Nos. 5,109,700 and 5,115,671, Method and Apparatus for Analyzing Rotating Machines). Hicho's method identifies a set of vibration peaks out of a measured vibration frequency spectrum that corresponds to the frequencies of 1×, 2× and/or 3× of the target RPM of the machine to be measured, and uses those frequencies to estimate the RPM.

This method is simple and straightforward. However, the accuracy of the method is limited to the frequency resolution, amplitude accuracy and background noise in the vibration frequency spectrum. The FFT technique employed to obtain the vibration frequency spectrum is inherently inaccurate due to the spectrum smearing or energy leakage in determining the true peak values of the vibration. Many low-cost data acquisition systems can only provide relatively low resolution of the FFT spectrum. In addition, the FFT technique of Hicho's method neglects the essential phase information of the vibration components and is not effective in suppressing the random noise when compared with averaging techniques in time domain such as "synchronous averaging". Another difficulty with this method is that the selection of a criterion to identify the peaks from the vibration frequency spectrum is arbitrary.

Another method of estimating the RPM of a rotating machine from vibration data is disclosed by K. R. Piety (U.S. Pat. No. 5,744,072, Method for Determining Rotational Speed from Machine Vibration Data). This method compares the measured vibration frequency spectrum of an unknown machine RPM with a reference spectrum of a known RPM from the same machine, derives a spectrum stretch factor that provides optimal correlation between the two spectra, and determines the RPM of the machine from the stretch factor and the known RPM of the reference spectrum. This method has the same limitations as Hitcho's method because it also operates on the FFT spectrum.

While it is important to obtain an accurate reading for RPM in connection with condition monitoring, RPM determination is merely one, albeit an important, step in the overall process. With various advances in information technology and new applications becoming available all of the time, the migration to on-line and coordinated monitoring of large groups of equipment is not surprising. In fact, given these improvements and new capabilities, the practice of machine maintenance has trended away from time-based solutions wherein machines are tested at particular time intervals and towards condition-based solutions wherein testing and problem resolution occurs only upon detection of a problem or a suspected problem.

In this way, the number of unnecessary machine servicing and testing sessions and shutdowns and their associated costs are greatly reduced. But perhaps even more importantly, costly machine breakdowns can be reduced or even eliminated in some cases due to the ability to detect faults earlier before they can do much damage.

Currently, the most widely used techniques to monitor the condition of rotating machines employ vibration measurements. Most machines have a typical vibration level and a frequency spectrum with a characteristic shape when the machine is in good condition. If a machine fault develops, the dynamic processes in the machine change and some of the forces acting on and within the machine therefore change. As a result, the vibration level and shape of the vibration spectrum changes. By monitoring the change in the vibration level and spectrum shape, a trained machine operator is usually able to detect not only the presence of a machine fault but also, in many cases, the type of fault present.

As the cost of data acquisition systems and computers is continually reduced, on-line vibration monitoring systems are becoming more and more popular as replacements for conventional portable measurement solutions throughout continuous process industries. The availability of on-line and historical vibration data provides operators with a means for continuously monitoring machine condition. However, at the same time, these machine operators and service personnel are subject to data overload given these new systems. Therefore, some level of automated data analysis is desirable so that attention may be focused on only those situations that require the same.

SUMMARY OF THE INVENTION

The present invention is a system and methodology for the continuous condition monitoring of rotating equipment. The present invention comprises a method that employs adaptive signal processing techniques to determine the RPM of a rotating machine from the time-based vibration data. According to a preferred embodiment of the present invention, RPM is determined based upon the input of a digitized time-based sample sequence of vibration data acquired directly from a vibration transducer mounted on the machine for on-line real-time measurement of the machine RPM. Alternatively, the input to the "virtual RPM sensor" could come from a database or file where the sample sequences of the vibration signal are stored for off-line measurement of the machine RPM. Once RPM is determined, online vibration analysis for a given RPM or set of RPMs may be performed. The present invention extracts characteristic vibration features from vibration data and uses these extracted values to provide condition detection and diagnoses of machine faults.

According to the teachings of the present invention, the method and system herein disclosed do not require expensive additional hardware to perform RPM sensing or vibration analysis and they do not require machine shut down to initiate a measurement or to perform on-line analysis on a periodic basis. Additionally, the process may be implemented quickly, efficiently and inexpensively on both new and existing machines and it can be applied to many machines at the same time using a single implementation.

In contrast to prior art techniques for estimating RPM value and performing condition monitoring, the present invention processes the vibration signal in the time-domain, which utilizes not only amplitudes of the different vibration components but also phase relationships between and among the components. This signal processing technique significantly reduces the effect of the background noise and greatly improves the accuracy of the RPM estimation and, as a result, better condition analysis.

In one embodiment of the present invention, RPM is determined via a software implementation of an adaptive signal-processing algorithm. Further, the RPM determining component preferably consists of three primary sub-components. The first sub-component is a digital band-pass filter which filters out the very high and very low components of the original vibration signal. The second sub-component is a coarse RPM estimator comprising an adaptive digital comb filter which is used as a starting point for the fine estimate of the RPM. Finally, the third sub-component is a fine RPM estimator which uses a mathematical vibration model to fine tune the RPM estimate as determined by the coarse estimator component.

As will be recognized by one of skill in the art, the present system and methodology provides a significant advantage over existing commercial systems in terms of cost. The present system eliminates the need for physical speed sensors via a "virtual" RPM sensing component. Since the adaptive signal processing algorithm of the present invention estimates machine speed directly from vibration data, the hardware costs and related services costs for an implementation of the present invention are substantially less than with prior art systems.

As disclosed herein, one primary advantage of the present invention is that it offers an ability to accurately calculate rotating machine running speed and perform continuous fault monitoring based solely upon a vibration signal produced by the machine.

Other significant advantages of the present invention include the facts that no speed transducer is needed to determine running speed, no additional hardware is required and the process and system may be implemented quickly and inexpensively on existing machines as well as new machines as they are added to the process.

These and other advantages and objects of the present invention will be apparent to those skilled in the art in connection with the following discussion and the attached Figs.

BRIEF DESCRIPTION OF THE DRAWINGS

FIG. 7A is a graphical illustration showing the concept of coherent vibration summation and averaging employed during the coarse RPM estimation step of the present invention;

DETAILED DESCRIPTION OF THE PREFERRED EMBODIMENTS

The system of the present invention is an automatic condition monitoring system for rotating equipment which operates to detect and classify faults based upon measured RPM and related vibration analysis. The system of the present invention automates on-line vibration analysis for any rotating machine, including, for example, compressors, turbines, generators, gears, pumps and motors. The benefits of the system and methodology of the present invention may be realized in industrial environments as well as any other environment in which such machines may be deployed. Through the use of the system and methodology of the present invention, machine fault detection and diagnosis may be made at an earlier stage than would be otherwise be possible thus limiting damage to machines resulting from continued operation in a fault state. Further, other advantages are obtained such as reduced need for service calls and time-based maintenance as well as overall improvement in process operation by making sure all machines involved are always operating properly.

The system of the present invention includes four major subsystems which combine to provide the advantages described above. The first subsystem is the data acquisition subsystem which operates to obtain vibration data via, for example, one or more vibration transducers. Another major subsystem is the RPM extraction subsystem which determines machine RPM based upon vibration data obtained by the data acquisition subsystem. Additionally, the system of the present invention preferably includes a data storage subsystem which stores data for use by other subsystems as is described in detail below. The system of the present invention further preferably comprises a signal processing subsystem which serves to provide fault detection and diagnosis as well as vibration feature extraction as described in detail below. Other components and features may also be provided in connection with the system of the present invention as described below.

Figure 1:
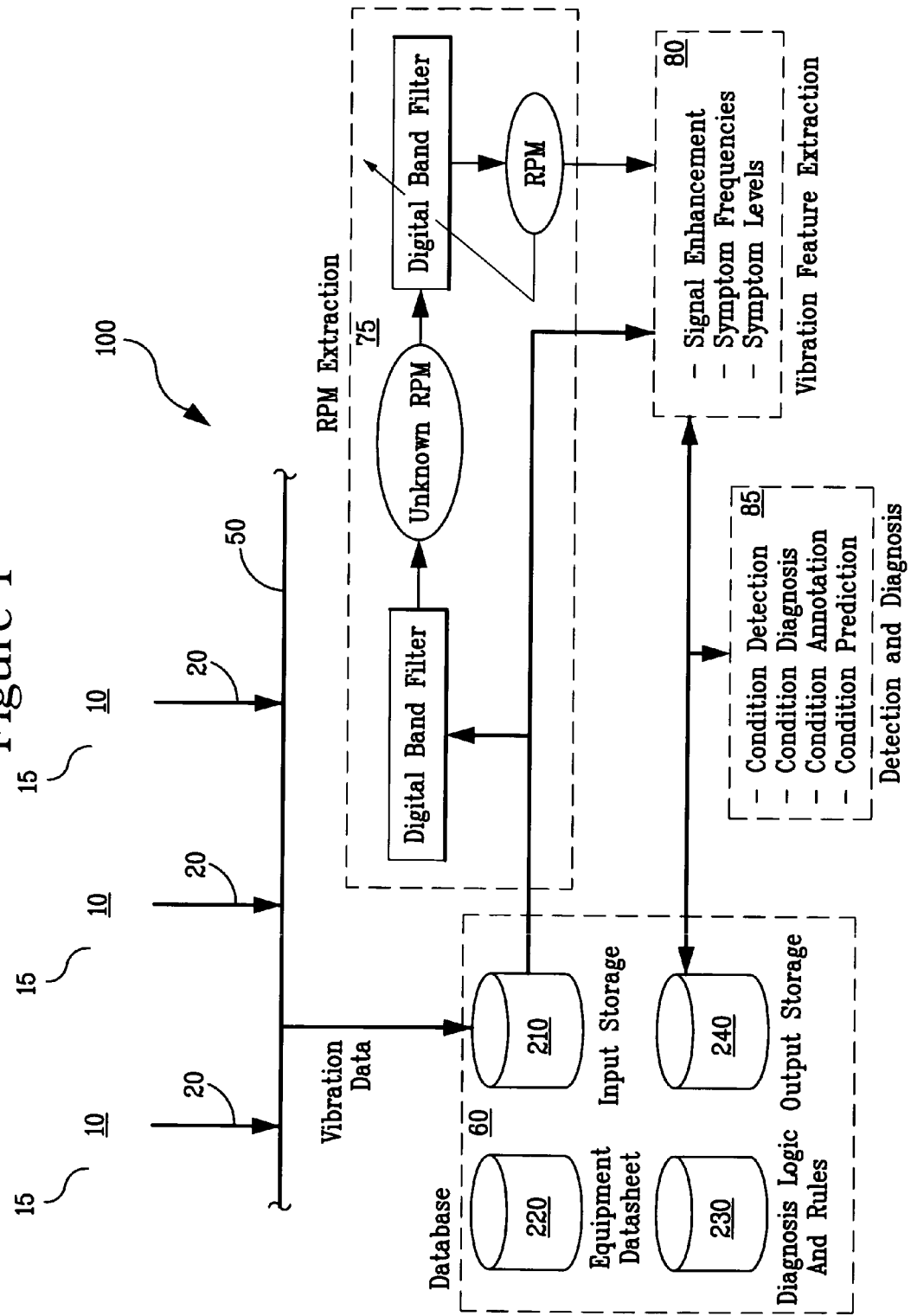
FIG. 1 is a component diagram illustrating the major components of the condition monitoring system of the present invention according to a preferred embodiment thereof.

The primary components of the present invention are now described in more detail in connection with FIG. 1. As can be seen in FIG. 1, a number of machines 10 comprising rotating equipment are monitored for faults via On-Line Condition Monitoring System (OCMS) 100. In a preferred embodiment, each of machines 10 is provided with at least one vibration transducer 15 as is known in the art and as is generally available for providing signals representative of machine vibrations. Transducers 15 may comprise accelerometer type transducers or any other device capable of converting vibration movement into electrical signals representative of such vibrations.

Signals 20 output by transducers 15 are acquired by data acquisition network 50 and are preferably digitized and then stored within database 60. Database 60 may be implemented, for example, as a disk drive on a personal computer or other computing device. Other implementations are also possible so long as data can be readily stored and accessed as needed on a real time or near real time basis. Database 60 may be broken down into multiple datasets which may or may not be located on the same physical storage device. For example as shown in FIG. 1, database 60 may be broken down into the following datasets: input storage 210, equipment datasheet storage 220, diagnosis logic and rules storage 230 and output storage 240. Input storage 210 comprises the data acquired on a periodic basis from the operating of machines 10 and in particular signals 20 generated by transducers 15 over time and in digitized form. The relevant discussion of the other datasets contained within database 60 in a preferred embodiment of the present invention is provided below.

The OCMS system 100 of the present invention also comprises an RPM extraction subsystem 75. This subsystem receives vibration data in the form of signals 20 from transducers 15 and generates an RPM value for each machine 10 based upon a novel process which involves first obtaining a coarse reading and then fine tuning the RPM reading as is described in detail below. RPM extraction subsystem 75 employs vibration data signals 20 either as they are received or after they have been stored in input storage dataset 210 in order to make an RPM determination.

Detection and diagnosis subsystem 85 provides fault detection and analysis based upon extracted vibration features and pre-set diagnostic logic and rule sets. As can be seen in FIG. 1, detection and diagnosis subsystem 85 receives input from output storage dataset 240 and vibration feature extraction subsystem 80 in order to perform detection and diagnosis functions.

In addition to an output from detect and diagnosis subsystem 85, both the RPM value from RPM extraction subsystem 75 and the original vibration data signals 20 are supplied to the vibration feature extraction subsystem 80 which serves to compute the features of the vibration signals 20 to measure the degree of fault symptoms determined.

The present system and methodology is, in a preferred embodiment thereof, implemented as a software based system resident on a general purpose computing device. As would be apparent to one of skill in the art, the present invention need not, however, be limited thereto and the teachings may be implemented in a variety of other ways including via hardware such as special purpose chips such as ASICs and/or digital signal processor (DSP) chips and/or programmable logic arrays.

Figure 2:
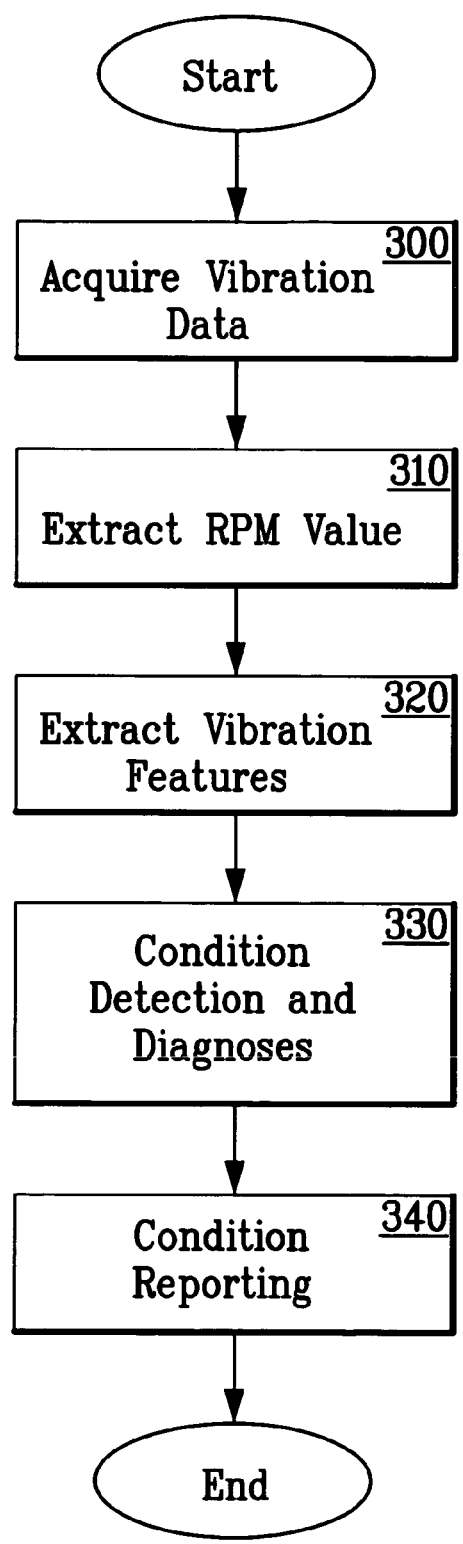
FIG. 2 is a flowchart illustrating the major steps in the process for condition monitoring according to a preferred embodiment of the invention.

Referring now to FIG. 2 and according to the teachings of the present invention, the methodology may be applied to monitor and provide fault detection capabilities for a number of machines. An overview of the process with respect to each machine is now provided. OCMS 100 first acquires the vibration signal from the vibration transducer on the machine (step 300). Next the acquired vibration data is used to extract an RPM value for the machine as is presently operating (step 310). The RPM extraction subsystem 75 adaptively estimates the RPM value from the vibration signal based upon an assumption that the machine vibration is steady. Once an RPM value for the machine has been determined, vibration features are extracted at step 320. Based upon the machine RPM value, the vibration feature extraction subsystem computes the characteristic features of the vibration signal that measures the degree of the associated fault symptoms. Following this, condition diagnosis and detection is performed at step 330. This step determines potential machine faults based upon extracted vibration features and preset rules. Finally at step 340, machine condition is reported to machine operators for action if necessary. The condition and related data may be stored within database 60 for historical purposes and/or to modify or adapt the rules based used in connection with future condition detection and/or diagnosis.

Figure 3:
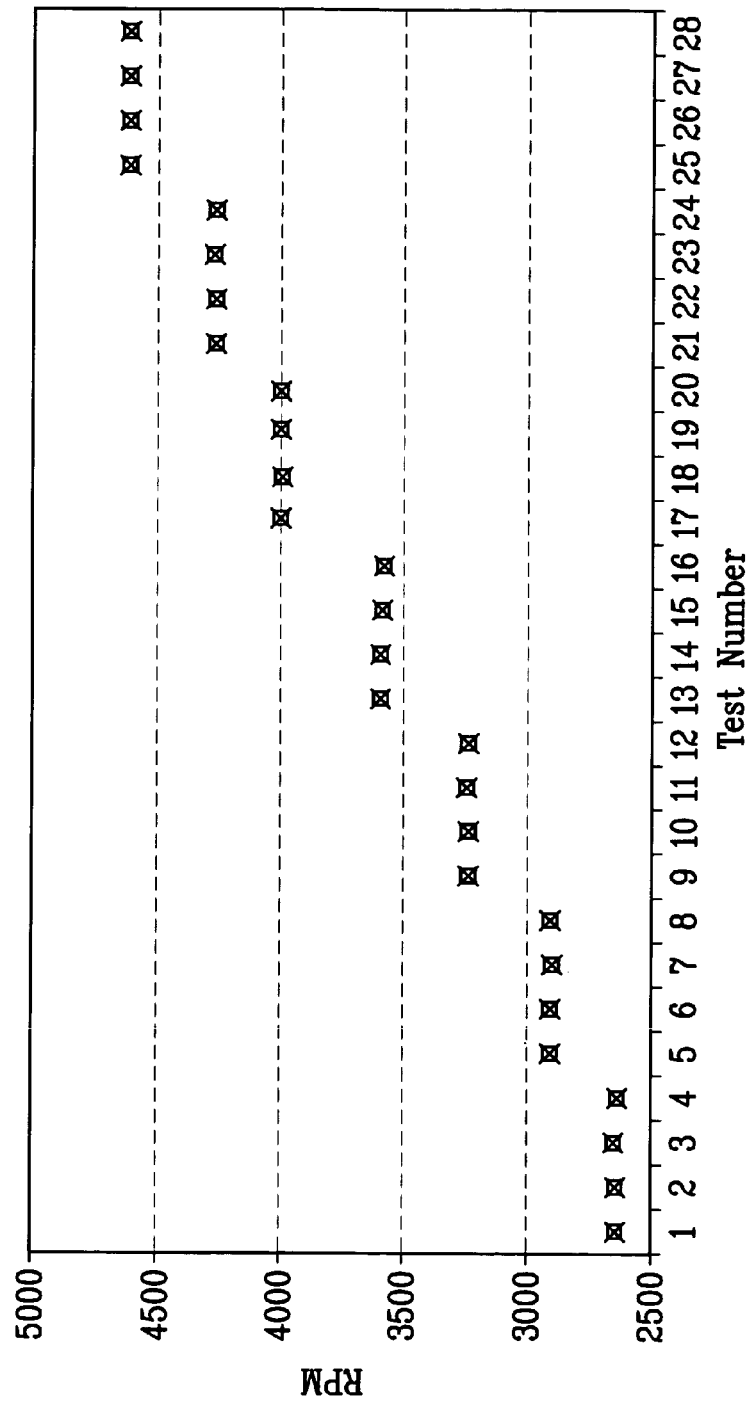
FIG. 3 is a chart illustrating the accuracy of RPM extraction values through the use of the methodology of the present invention.

Turning now to a description of the process and system of the present invention in detail and once vibration data has been acquired, the first step is to extract an RPM value for the machine based upon the acquired vibration data. In that regard, FIG. 3 compares test data of extracted RPM's from a rotating machine against the measured RPM's over a speed range of 2500–4700 RPM. As can be seen, the RPM extraction methodology which is next described provides very good accuracy for RPM determination.

Figure 4:
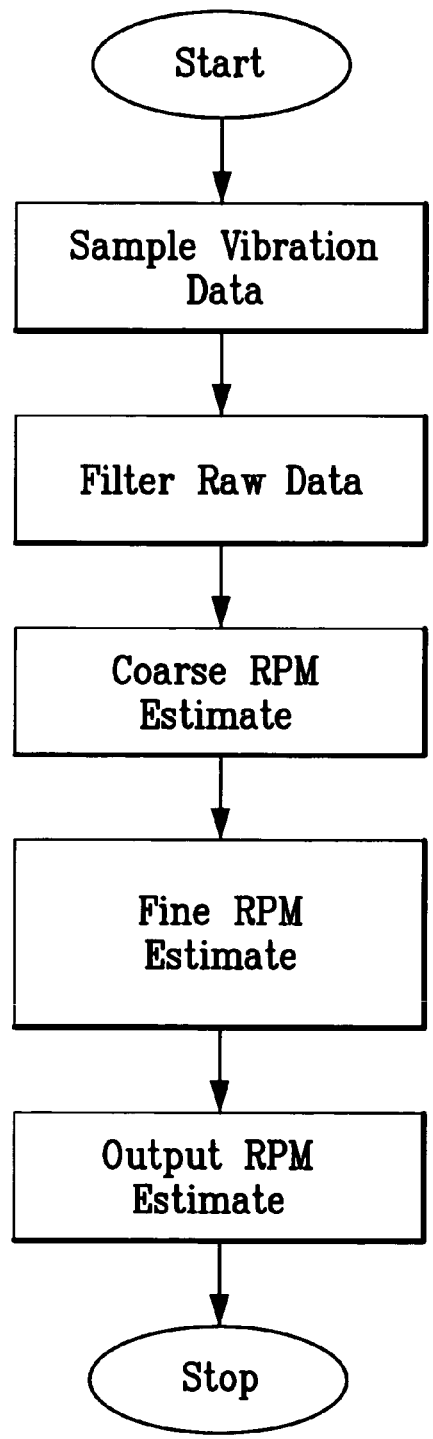
FIG. 4 is a flowchart illustrating the sequence of the five major steps comprising the process of the present invention for estimating the RPM of a rotating machine according to a preferred embodiment.
Figure 5:
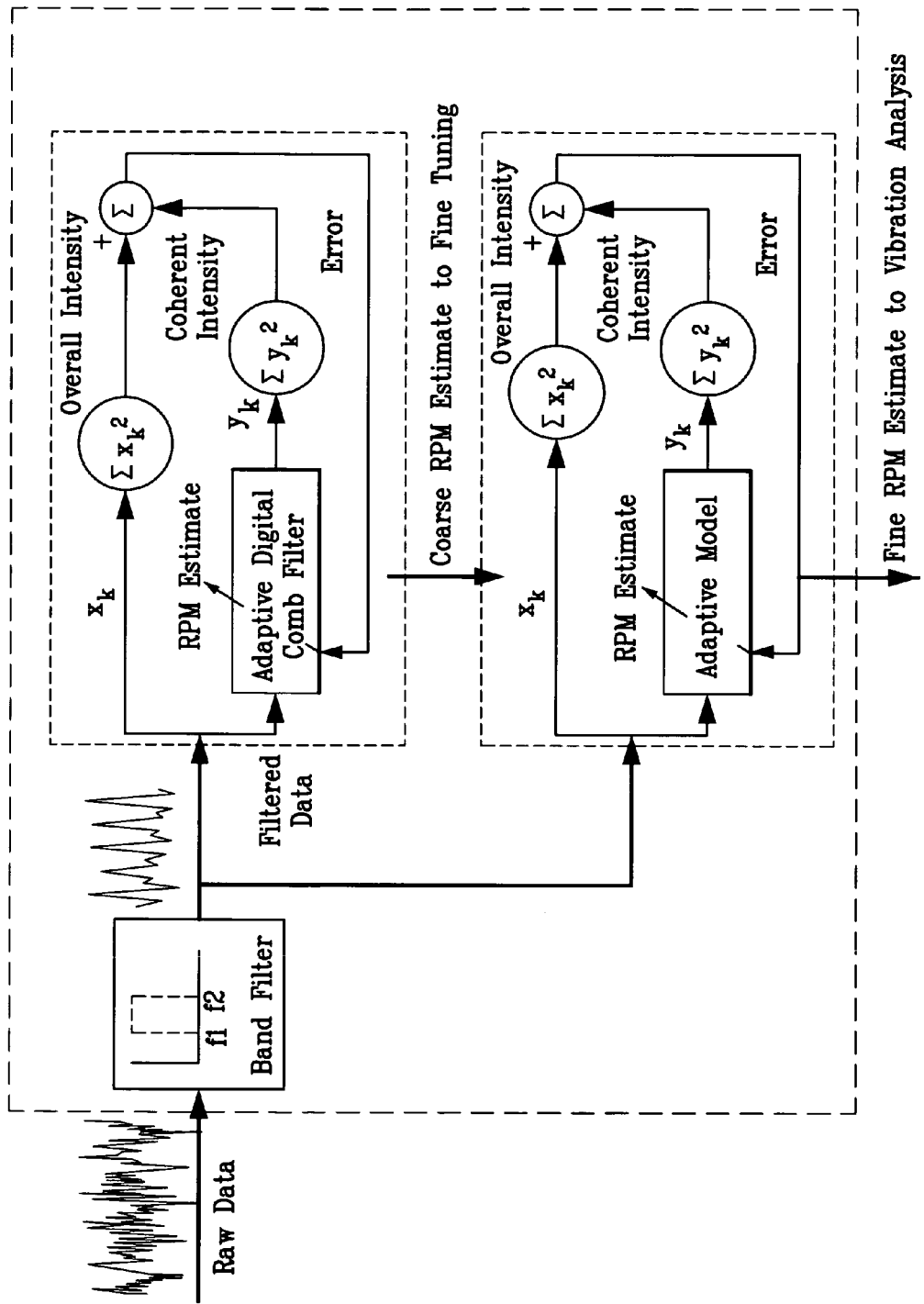
FIG. 5 is a component diagram illustrating the subsystem components of the virtual RPM sensor of the present invention according to a preferred embodiment thereof.

In describing the subsystem and methodology for extracting RPM ("virtual RPM sensor") of the present invention, a general description of the process is first provided in connection with FIGS. 4 and 5. Following that, a more detailed description of each step in the overall process is provided in connection with other Figs. As the description progresses, it will be apparent to one of skill in the art that the operation of the virtual RPM sensor of the present invention is based upon two underlying assumptions. The first is that the vibration of the relevant machine is steady over the period during which the vibration waveform measurement is taken. The second assumption is that the vibration at the harmonic frequencies of the machine RPM (e.g. 1×RPM, 2×RPM, etc.) are coherent. It is under conditions that these assumptions are met that the methodology of the present invention will provide the most accurate RPM readings. As is known in the art, the operational characteristics of most rotating machines in use in commercial processes today are likely to conform to the underlying assumptions described above.

Turning now to FIGS. 4 and 5, it can be seen that during the first step in the overall process of the present invention the system samples vibration data originating from the subject machine. This sampled signal is referred to herein as the RAW SIGNAL. The RPM sensor subsystem of the present invention may preferably be conFig.d to use constant sampling intervals for the vibration data as will be discussed in greater detail below. In the second step of the process of the present invention the RAW SIGNAL is passed through a digital band-pass filter which removes low and high frequency components of the RAW SIGNAL. By performing this filtering step, the signal-to-noise ratio of the low order periodic components may be enhanced. It is preferable to perform this filtering step in connection with the overall process of the present invention in order to avoid contamination of the RPM estimate as a result of high and low frequency noise. According to a preferred embodiment of the present invention, the filtering process is controlled so as to ensure the inclusion of the lowest order vibration components in the filtered signal (FILTERED SIGNAL). Further, it is preferable that the filter be designed such that the resulting FILTERED SIGNAL includes only the frequencies of the first two or three RPM orders (e.g. 1×RPM, 2×RPM and possibly 3×RPM).

Following the filtering step, the third major step in the RPM sensing process is the coarse RPM estimate step which processes the FILTERED SIGNAL to generate a coarse RPM estimate (COARSE RPM ESTIMATE) for the relevant machine. In a preferred embodiment of the present invention, the FILTERED SIGNAL is passed through an adaptive digital comb filter to produce the COARSE RPM ESTIMATE. Preferably, the digital comb filter employs a Least Mean Square (LMS) algorithm as discussed below to provide a COARSE RPM ESTIMATE that minimizes the error between the overall vibration power and the coherent vibration power. As will be discussed in greater detail below, the COARSE RPM ESTIMATE generated by this step is coarse because the system searches a set of discrete possible RPM values that depends upon the sampling interval of the RAW SIGNAL as defined by the system configuration.

The fourth major step in process of RPM sensing involves generating a fine RPM estimate. The adaptive algorithm used in this step is similar to the digital comb filtering algorithm employed in the previous step although during this step a continuous vibration model of periodic vibration is used to generate the coherent vibration power. The details of this step of the overall process are described in greater detail below.

Finally, during the final and fifth step of the process of RPM sensing, the estimated RPM value for the machine which is generated upon completion of the fine RPM estimate is output. The output step may consist of simply displaying or printing the value for a user. However, in a preferred embodiment of the present invention, the RPM value is used by other subsystems within OMCS 100 in order to provide fault detection and diagnosis capabilities. By providing an accurate RPM reading according to the teachings of the present invention, the results of the aforementioned fault diagnosis operations may be greatly improved even without the need for additional hardware such as direct speed sensor components.

It will be understood by one of ordinary skill in the art that although the above processes and algorithms are preferably carried out through a software implementation (i.e. software that performs signal processing upon the RAW SIGNAL and the other signals generated though the process flow), some or all of the steps or system components may be performed by or replaced by, respectively, hardware components (such as a micro-controller or the like) which perform the equivalent or similar functionality without departing from the scope or spirit of the present invention.

Now that a general overview of the process and subsystem for RPM extraction of the present invention has been provided, the following discussion provides details with respect to each subsystem component and process step according to the preferred embodiments of the present invention.

Step 1—Sample Vibration Data

In a preferred embodiment of the present invention, vibration data is obtained through the use of a vibration transducer 15 which is placed in physical contact with the machine 10 for which RPM is to be measured. As a result, the vibration transducer 15 senses the vibrations produced by the machine 10 and converts those vibrations into an electrical signal. Preferably, the time-based electrical signal (continuous waveform signal) output from the vibration transducer 15 is digitized by an ADC (Analog-to-Digital Converter) in connection with a PC-based data acquisition system. The digitized sample sequence of the electrical signal is fed into the system of the present invention as the RAW SIGNAL. In the following description, the RAW SIGNAL is represented mathematically as a discrete sample sequence z(n) where n=0, 1, 2 . . . N−1 and N is the total number of samples in the sequence.

During the digitization process, the sampling interval of the ADC should be kept as constant and the sampling rate or frequency should be at least two times more frequent than the maximum frequency of the vibration signal in order to avoid an aliasing effect. For example, if the maximum frequency of the vibration is 1000 Hz, the sampling rate should be higher than 2000 Hz. Preferably, the sampling rate is 4 to 6 times more frequent than the maximum frequency of the vibration signal. If necessary, an anti-aliasing analog low-pass filter should be used before the digital sampling in order to remove high frequency components.

The time duration of the sampling or length of sample sequence should be sufficiently long in order to obtain an accurate estimate of the RPM. Preferably, the length of the sample sequence should be at least 20 times longer than the period of one complete rotation of the machine. For typical pumps and motors of nominal speed of 3600 RPM, the length of the sample sequence should be ⅓ seconds or longer.

Once the vibration data has been sampled as described above, the process may proceed to the next step wherein the RAW SIGNAL is further processed according to the teachings of the present invention.

Step 2—Digital Filtering

The next step in the process of RPM extraction according to the present invention calls for passing the RAW SIGNAL through a digital band-pass filter in order to remove very low and very high frequency components from the RAW SIGNAL. The output of the filter will be the FILTERED SIGNAL, a sample sequence of the same length as that of the RAW SIGNAL. This step serves to enhance the signal to noise ratio of the periodic components in the low orders of the machine speed. According to the teachings of the present invention, the filter is designed such that the FILTERED SIGNAL contains only the lowest order vibration components. In a preferred embodiment of the present invention, the filter is designed such that the frequencies which are permitted to pass through the filter include only the frequencies of the first two or three RPM orders (e.g. 1×RPM, 2×RPM and possibly 3×RPM). Alternatively, a low pass filter can be used in the place of the band pass filter if the vibration components below the frequency of 1×RPM are very low. Furthermore, if the low order vibration components dominate the original vibration signal a null filter (no filtering operation) can also be used.

Figure 6:
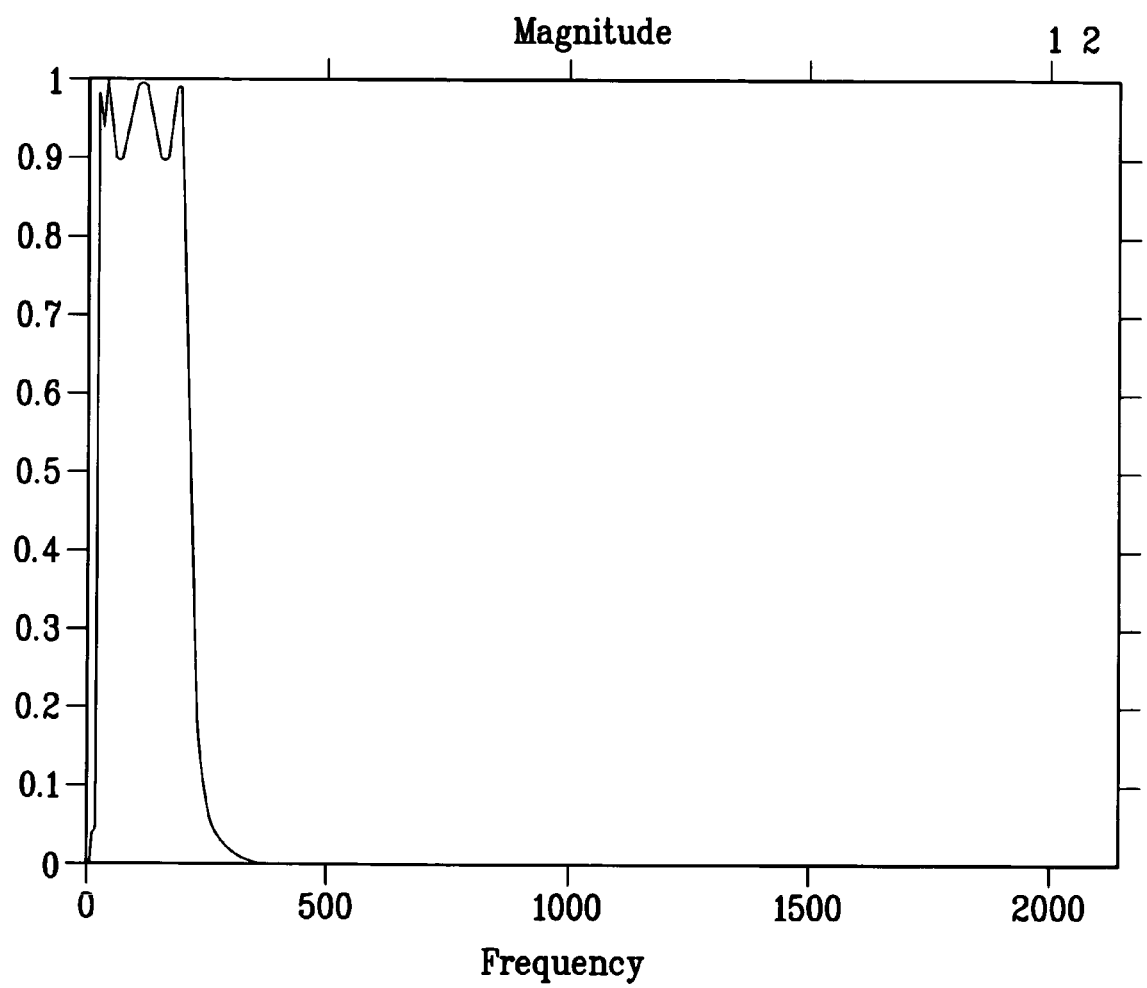
FIG. 6 is a graph illustrating the function of a digital band-pass filter designed to filter out the very high and very low components of the original vibration signal during the raw data filtering step of the present invention.

Turning now to FIG. 6, an example of the frequency response of a digital band-pass filter which may be utilized as a component of the RPM extraction subsystem of the present invention is provided. In a preferred embodiment of the invention, an infinite impulse response (IIR) type filter is used. As will be apparent to one of skill in the art, however, other filter types such as a finite impulse response (FIR) type filter may also be used. According to the teachings of the present invention, because different machines may have different operational RPM ranges, the band-pass filters employed to perform the filtering step may vary by application. Of course, if a group of machines have a similar or reasonably close RPM operational range, a single digital filter may be used in the RPM extraction subsystem of the present invention in connection with measurements taken on each of those machines. If operating ranges of machines vary significantly, provision may be made in the software implementation of the present invention for selection of one of many available filtering algorithms based upon the expected operational speed of the machine or machines to be measured.

Preferably, the digital filter is implemented in the time domain in a software process. The filtering operation is defined by the following equation:

$$a_0 x(n) = \sum_{j=0}^{K} b_j z(n-j) - \sum_{j=1}^{K} a_j x(n-j)$$

where K is the order of the filter, $a_j$ and $b_j$ are the coefficients of the filter, and z(n) and x(n) are the sample sequences of the RAW SIGNAL and FILTERED SIGNAL.

Step 3—Coarse Rpm Estimation

Once the RAW SIGNAL has been converted into the FILTERED SIGNAL through the use of the filtering algorithm described above, a coarse RPM estimation is determined based upon the FILTERED SIGNAL through the use of an adaptive digital comb filter which is preferably implemented in software according to the teachings of the present invention. The filtering operation of this step preferably employs a Least-Mean-Square algorithm that provides an RPM estimate that minimizes the error between overall vibration power and coherent vibration power. The estimate is coarse because the estimate is determined by searching a set of discrete possible RPM values that depend upon the sampling interval of the original signal.

The comb filter of the present invention preferably employs the adaptive synchronous time-domain averaging technique. According to this technique, the sample sequence of the FILTERED SIGNAL (referred as a total record herein) is divided into a number of sub-sequences (referred as sub-records herein) with an equal number of samples. Next, the sub-records are summed point by point into a single record and averaged by the number of the sub-records. This summation and averaging is illustrated in FIG. 7A.

As can be seen in FIG. 7A on the top, if the captured waveform is divided into sub-records which are in phase with one another, these sub-records add up coherently so long as the length of the sub-records is equal to the exact period of the machine rotation. However, as shown in the bottom of FIG. 7A, when the sub-records are out of phase with one another, they tend to cancel each other out when the sub-record length differs from the exact period of the machine rotation.

Figure 7:
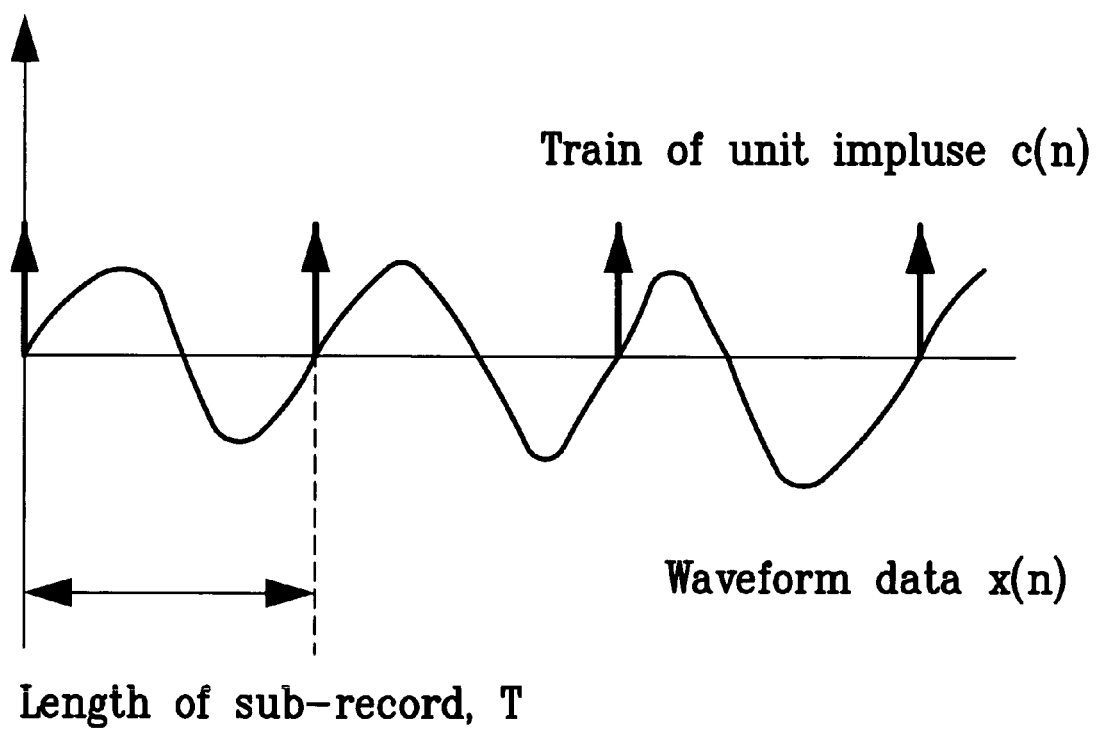
FIG. 7 is a graphical diagram illustrating a unit input train for waveform data in connection with the synchronous time domain averaging technique employed during the coarse RPM estimation step of the present invention.

If the length of the sub-records is exactly equal to the period of 1×RPM vibration, then the sub-records will be in phase with each other in terms of RPM-associated vibration components and the summation of the sub-records will add up coherently. Otherwise, the sub-records will be generally out of phase and the summation of the sub-records will tend to cancel each other. The adaptive synchronous averaging searches this "exact length" through a predefined range of the sub-record length. As a result of the adaptive synchronous averaging, the coherent vibration power is at its maximum if the length of the sub-records is equal to or closest to the "exact length". Mathematically, the synchronous averaging technique can be described by a convolution of the FILTERED SIGNAL data with a train of unit impulse as is shown in FIG. 7. The period of the unit impulse train is set equal to the length of the sub-records.

The sequence of the impulse train illustrated in FIG. 7 can be defined as:

$$c(n, P) = \frac{1}{M} \sum_{i=0}^{M-1} \delta(n - iP)$$

where the delta function is 1 when n=iP and zero otherwise. P is the length of the sub-record in terms of the number of samples and M is the number of sub-records.

The synchronous average of the FILTERED SIGNAL sample sequence x(n) is then calculated by:

$$\bar{x}(n, P) = \sum_{j=0}^{N-1} c(n, P)x(n - j)$$

where N is the total number of samples in the sample sequence x(n). In the above convolution equation, the impulse train functions as a filter whose shape is similar to a comb in the frequency domain. The c(n) represents the coefficient of the digital comb filter used in connection with the coarse RPM estimation step. It will be noted by one of skill in the art that the average of x(n) is a function of the sub-record length P. The RPM extraction subsystem of the present invention determines P such that it is equal to or the closest possible to the true period of the 1×RPM vibration. Once P is found, the estimate of the RPM is then:

$$RPM_c = 60 \frac{f_s}{P}$$

where $f_s$ is the sampling frequency of the original vibration data.

An adaptive algorithm is used to adjust P such that the error is minimized. The error function is the difference between overall vibration power and coherent vibration power, defined as:

$$J(P) = \frac{1}{N}\left[\sum_{n=0}^{N-1} x^2(n) - \sum_{n=0}^{N-1} \bar{x}^2(n, P)\right]$$

An alternative error function could be constructed with mean squared error:

$$J(P) = \frac{1}{N}\left[\sum_{n=0}^{N-1} [x(n) - \bar{x}(n, P)]^2\right]$$

In a preferred embodiment of the invention, the algorithm of the coarse RPM estimation step starts with an initial value of $P_{min}$ and then searches through a range of $P_{min}$ through $P_{max}$ until a P is found that minimizes the error function J. The selection of $P_{min}$ and $P_{max}$ requires prior knowledge of the maximum possible variation in machine RPM for the particular machine for which rotation speed is being measured. In a preferred embodiment, the range of plus and minus 20% of normal machine speed may typically be used for the variation range.

Since P is a multiple of the sampling interval used in the data acquisition phase, the accuracy of the coarse RPM estimation obtained from this step is limited to how fast the waveform data is sampled or the related sampling frequency. However, based upon the technique discussed above and the related calculations, the true machine RPM will fall within the following range:

$$60\frac{f_s}{P+1} < RPM < 60\frac{f_s}{P-1}$$

Step 4—Fine Rpm Estimation

Once a coarse RPM estimate has been obtained as discussed above, the next step is to use a mathematical vibration model to fine tune the RPM estimate. The adaptive algorithm used in this step is similar to the digital comb filter used in connection with the coarse RPM estimation step but in this case a continuous vibration model of periodic vibration as a function of machine speed is used to generate the coherent vibration power. The preferred methodology for determining the fine RPM estimate is:

$$\bar{x}(n, RPM) = \sum_{i=1}^{K} A_i Cos\left(i\pi \frac{RPM}{30} \frac{(n-1)}{f_s} + \theta_i\right)$$

where $f_s$ is the sampling frequency, K is the number of harmonics as orders of RPM, $A_i$ and $\theta_i$ are the amplitude and phase angle of the i-th vibration harmonic, and RPM is the target. In a preferred embodiment of the invention, the value of K is chosen such that the maximum frequency of the FILTERED DATA falls within the frequency range of the (K−1) and K orders in the model. The maximum frequency of the FILTERED DATA is usually the upper cut-off frequency of the digital band filter used in the filtering step. The step length for the RPM search is selected for precision requirement. For example, for a precision of +/−1.0 RPM, the step length is 1.0 RPM.

An adaptive algorithm similar to the one described above for the coarse RPM estimation is used to search for the fine RPM estimate within the range determined by the coarse estimation step as detailed above. It is preferable that while searching in this range, the search is conducted such that the error function J described above in connection with the coarse estimation step is minimized through iterations. For each iteration, a target RPM is chosen, and the coefficients $A_i$ and $\square_i$ are calculated with a Discrete Fourier Transform (DFT). Then, the error function J is calculated. The fine estimate for the true RPM is the target RPM that minimizes the error function J. Although the algorithm reflects a nonlinear cost function of RPM, the methodology and the equation above can be linearized with respect to RPM when the search range is relatively small and a fast computation algorithm and significant processing power are available.

Step 5—Output Rpm Estimation

Once the fine RPM estimation has been determined by first obtaining a range in the coarse estimation step and then searching that range for a fine estimation during the fine RPM estimation step, the system of the present invention preferably outputs the fine RPM estimation value for the user to view. As discussed above, according to the teachings of the present invention in a preferred embodiment, the results are fed directly to other subsystems of OMCS 100 for further processing including vibration analysis and/or fault diagnosis processing.

APPLICATION EXAMPLE

In order to further illustrate the RPM extraction subsystem and the method of the present invention, a real-world application example is now provided wherein raw vibration data was acquired for two motor-driven pumps in order to test system performance. In this case, the design speeds for both pumps were 3600 RPM. Using a speed resolution of +/−1 RPM, the pump speeds were measured by the system of the present invention to be 3538 RPM for Pump 1 and 3579 RPM for Pump 2.

Figure 8:
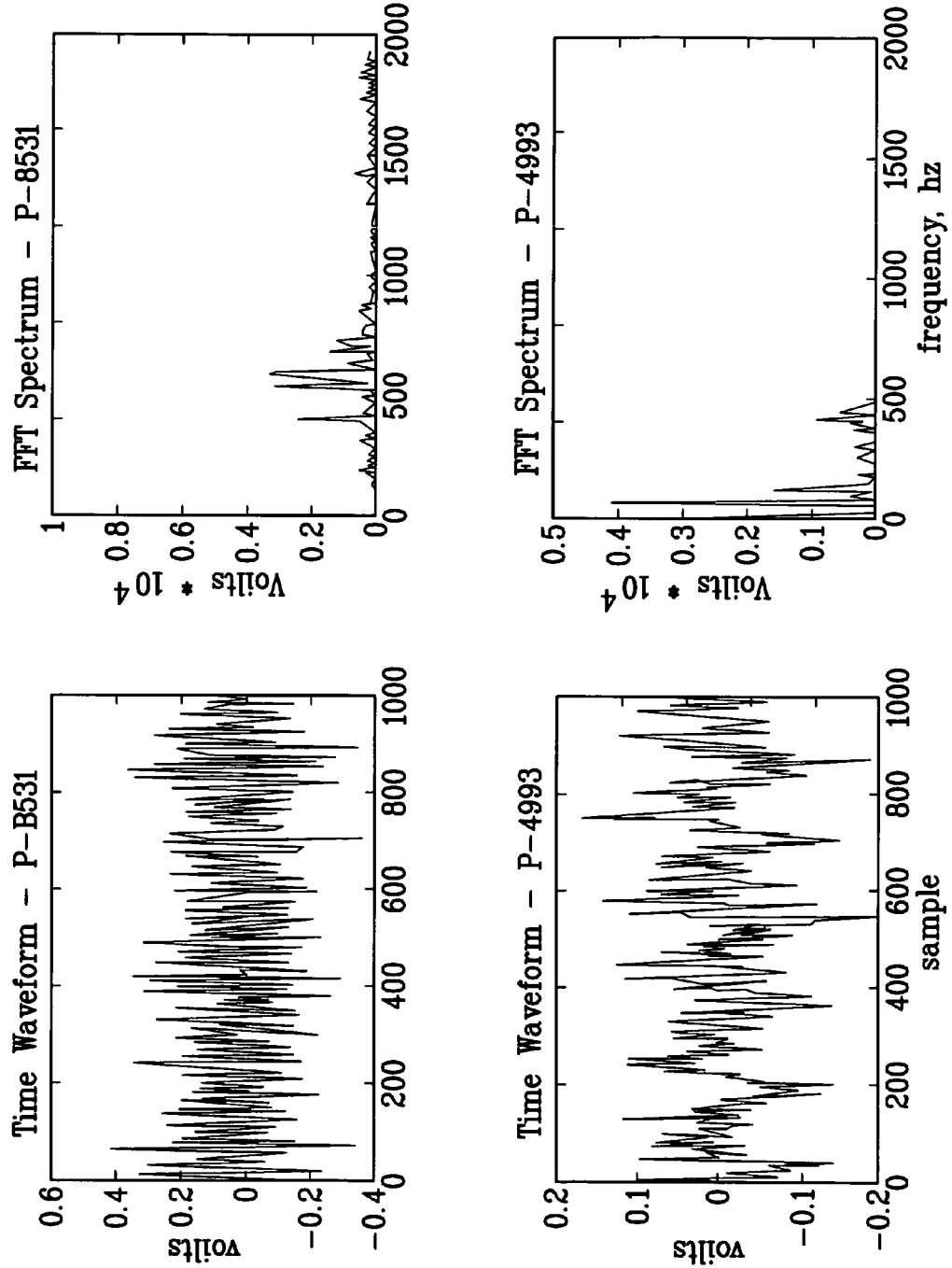
FIG. 8 is a graphical illustration showing original vibration waveforms and frequency spectrums for two pumps used in connection with the testing of the system of the present invention.

FIG. 8 illustrates the vibration waveforms and frequency spectrums for both Pump 1 and Pump 2. The pumps have significantly different vibration characteristics in that Pump 1 exhibits a fairly simple spectrum with dominantly low frequency vibration while Pump 2 generates a very complex spectrum with excessive high frequency components and a significant amount of broadband noise. There is also a substantial amount of DC noise in the spectrums due to the integration of the data acquisition system during the testing period.

Figure 9:
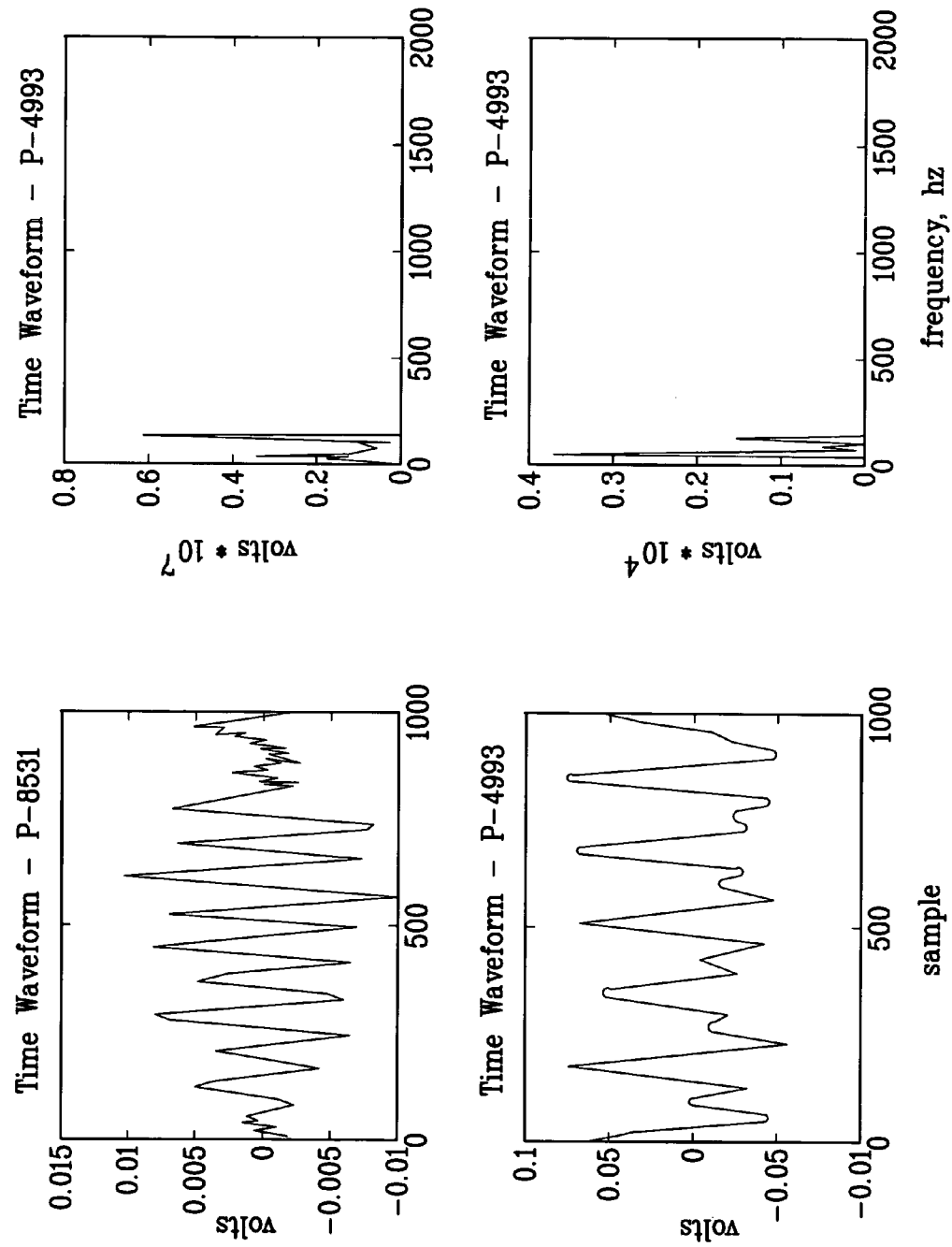
FIG. 9 is a graphical illustration showing filtered vibration waveform and frequency data for two pumps used in connection with the testing of the system of the present invention.

The graphs in FIG. 9 illustrate vibration waveform and frequency data for the two pumps after completion of the filtering step of the present invention wherein a digital band-pass filter is used to filter higher order harmonics and noise from the waveform and frequency data. As compared to the raw vibration data graphs in FIG. 8, it can be seen that the filtered data in FIG. 9 contains only the first two harmonics (1×RPM and 2×RPM) and the periodicity of the vibration data is much more apparent.

Figure 10:
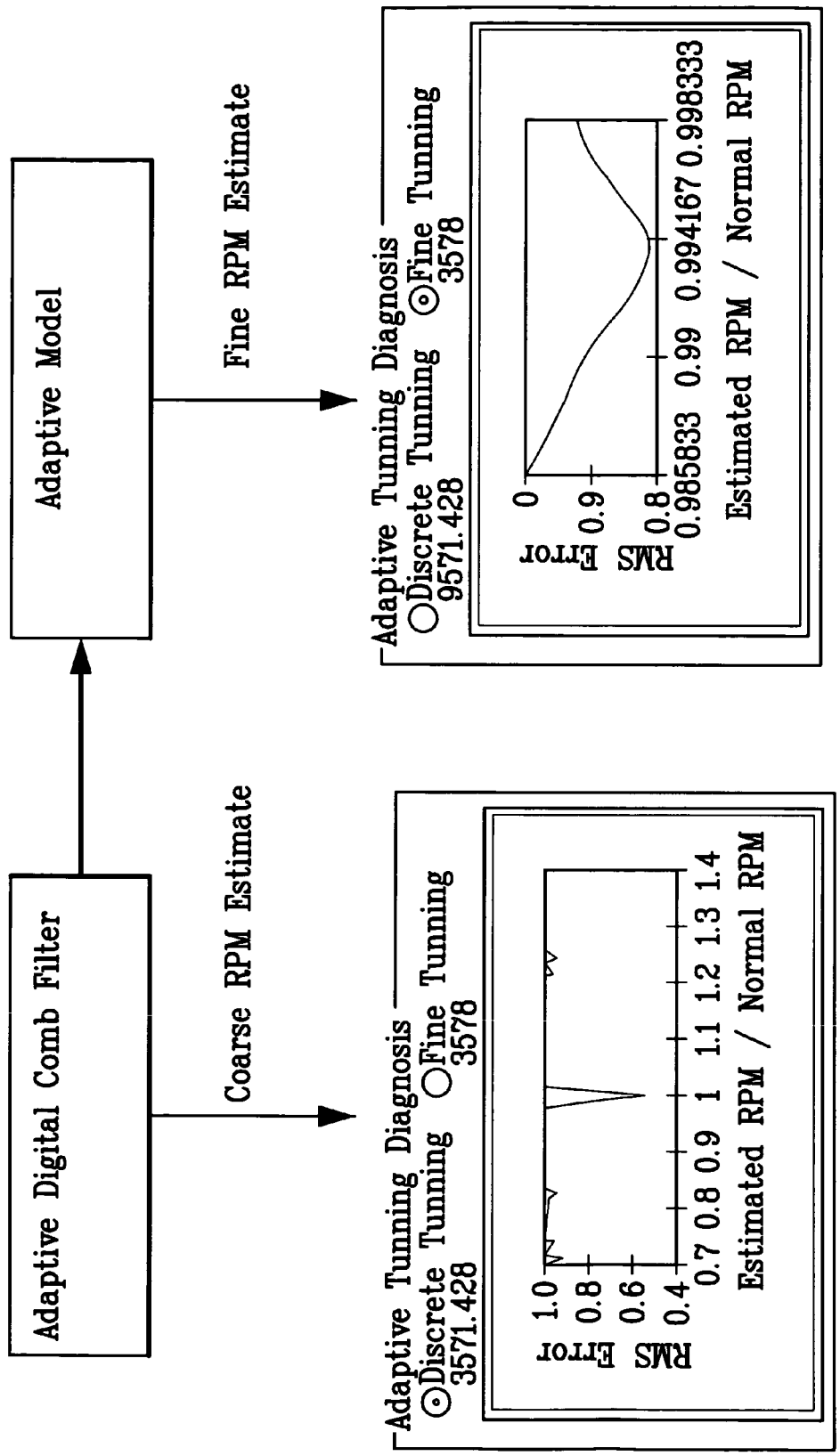
FIG. 10 is a graphical illustration showing coarse and fine RPM estimates generated by the system of the present invention for one of the two pumps used in connection with the testing of the system.

Finally, FIG. 10 illustrates the RPM estimation output resulting from the system of the present invention upon testing Pump 2. As can be seen from the Fig., the coarse RPM estimation generated by the system was 3571.4 RPM and the fine estimation generated was 3578 RPM. These compare to an actual speed of 3579 RPM as measured by a speed sensor. The estimation error in this case is −1 RPM.

During the testing of both pumps, a total of approximately 10 minutes of vibration data was acquired for each pump, with the testing divided into several segments. Each segment of vibration data was used as input to the system of the present invention in order to obtain an instantaneous RPM estimate. The following table lists the fine estimates of RPM values for each of the pumps using the different segments of data.

| VIBRATION WAVEFORM | RPM ESTIMATE | |
|---|---|---|
| DATA | PUMP 1 | PUMP 2 |
| Segment 1 | 3537 | 3579 |
| Segment 2 | 3536 | 3577 |
| Segment 3 | 3541 | 3576 |
| Segment 4 | 3537 | 3579 |
| Segment 5 | 3539 | 3578 |
| Segment 6 | 3538 | 3577 |
| Segment 7 | 3539 | 3579 |
| Segment 8 | 3537 | 3577 |
| Mean of RPM Estimates | 3538.0 | 3577.8 |
| Standard Deviation | 1.6 | 1.2 |
| Measured RPM's | 3538 | 3579 |

Using the RPM estimates of the system of the present invention, the accuracy of spectrum analysis even for an order of 20 (20×RPM) is less than 1 Hz. It would be very difficult to achieve this quality of result even through the use of a high-resolution FFT analyzer.

Once RPM has been extracted according to the description above, OMCS 100 at step 320 in FIG. 2, next employs vibration feature extraction subsystem 80 to extract vibration features which are required to perform fault detection and diagnosis according to the teachings of the present invention. Vibration features represent data that is useful in condition monitoring and which is obtained from the original vibration signals. By definition, vibration features are correlated with a set of known machine faults based upon statistical definition of machine faults. Vibration features, as discussed above, may also be employed in determining the particular symptoms of the machine fault if present. Although there is no single set of vibration features that can be created that covers all kinds of machines and all kinds of machine faults, there does exist a well defined set of vibration features attributable to common machine problems.

The most widely used vibration features are a set of discrete frequencies referred to as symptom or fault frequencies, and each machine has a corresponding vibration level at each fault frequency as well as change rate of vibration level at the particular frequency over time. One or a combination of several fault frequencies and corresponding vibration levels at those frequencies is usually linked to a specific kind of machine fault and the symptom levels at those frequencies indicate the degree of the fault while the change rate of the symptom level represents the growth of the fault. In connection with the vibration feature extraction analysis of the present invention, extraction of symptom frequencies and symptom levels are both performed in two steps. In a preferred embodiment, vibration features which are extracted are stored in database 60 periodically and with a time stamp so that the change rate of the symptom levels can be determined and acted on if necessary.

The first step in extracting vibration features according to a preferred embodiment of the present invention is extraction of the symptom frequencies at which vibration levels are to be determined. Because the symptom frequencies are directly proportional to the RPM value, the system and method of the present invention employs the estimated RPM as determined in step 310 and an equipment datasheet from equipment datasheet dataset storage 220 to determine the actual values of the symptom frequencies. The particular values for each machine in the equipment datasheets are dependent upon the particular machine being monitored and previous experience with the operation and faults associated with the particular machine.

There are two types of the symptom frequencies: ordered and non-ordered frequencies. The ordered frequencies are multiples of the RPM and given by 1×RPM, 2×RPM 3×RPM, . . . K×RPM where K is an integer. The ordered frequencies are usually associated with shaft problems such as unbalance, misalignment, a bent shaft, blade or vane-induced turbulence, a damaged gear tooth, or driver problems. The non-ordered frequencies are given by $A_1 \times$RPM, $A_2 \times$RPM. Where $A_i$ is non-integer number. The non-ordered frequencies are usually associated with bearing problems such as a defect in or damage to an inner race, outer race or cage of ball or roller bearings. Other examples of problems associated with non-ordered frequencies are loose in housing or oil film whirl and the whip of a journal bearing. By way of example, the following lists the factors for the symptom frequencies which may be associated with a typical a ball or roller bearing in a typical machine:

Inner Race Ball Pass: $A_{inner} = \frac{n}{2}\left(1 - \frac{BD}{PD}\cos\beta\right)$ (1)

Outer Race Ball Pass: $A_{outer} = \frac{n}{2}\left(1 + \frac{BD}{PD}\cos\beta\right)$ (2)

Ball Spin: $A_{ball} = \frac{PD}{BD}\left[1 - \left(\frac{BD}{PD}\cos\beta\right)^2\right]$ (3)

where n is the number of balls or rollers, BD is ball diameter, PD is pitch diameter, β is the contact angle.

Figure 11:
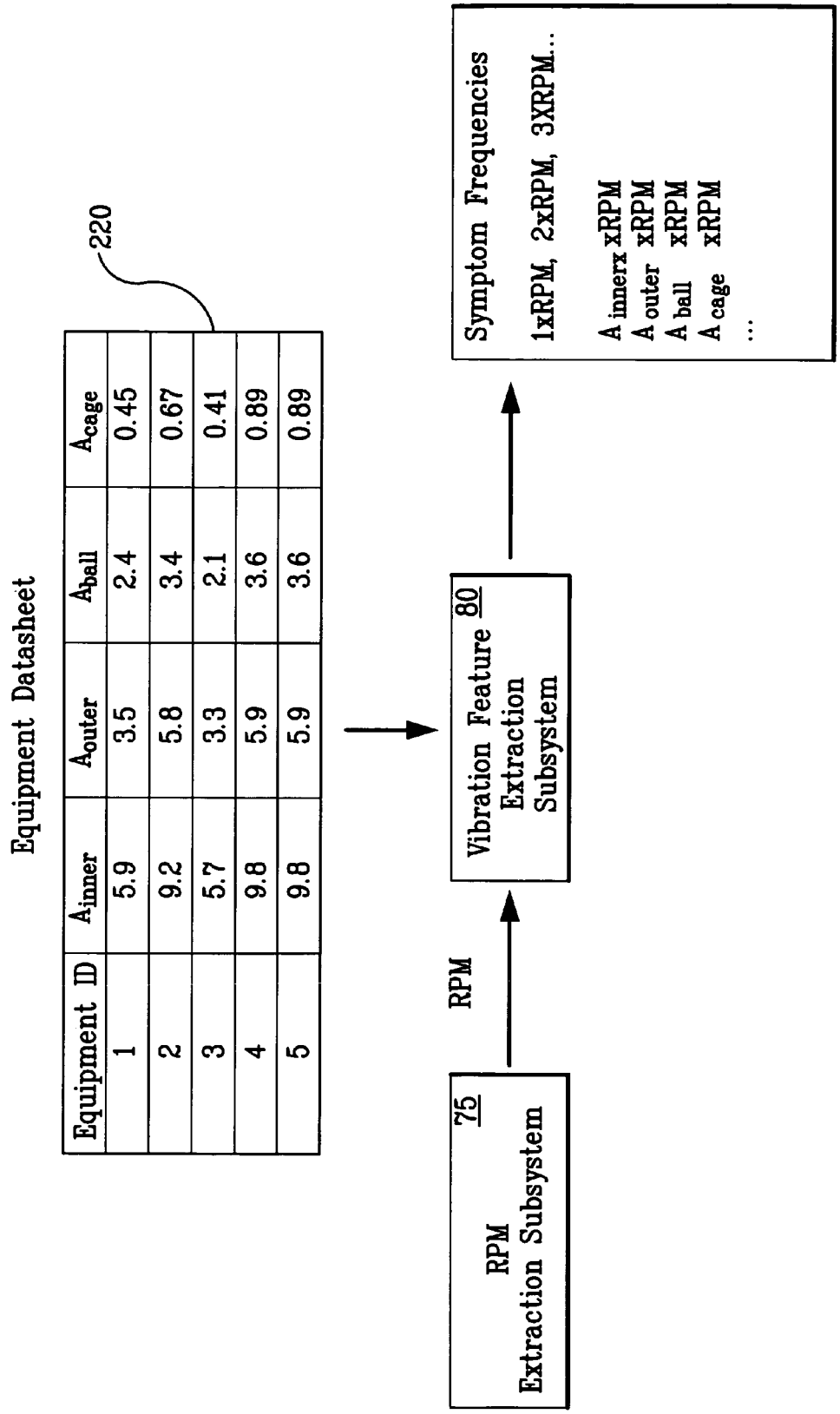
FIG. 11 is a graphical illustration detailing an example of the methodology for extracting symptom frequencies for a particular machine component according to a preferred embodiment of the present invention.

Since the multiplication factor $A_i$ is specific for each individual machine and is typically defined by the machine operators, an equipment datasheet in the equipment datasheet dataset 220 is used to store those factors. Referring now to FIG. 11, an example of how the system and method of the present invention, in a preferred embodiment thereof, determines the symptom frequencies.

By way of example in FIG. 11, it can be seen that vibration feature extraction subsystem 80 employs the machine RPM determined by RPM extraction subsystem 75 as well as data in equipment datasheet in the equipment datasheet dataset 220 to determine symptom frequencies for each of five exemplary machines. Assuming, for example, a currently measured operating RPM of machine 1 measured as 3500 RPM, in this case, the multiplier for the inner race for machine 1 is 5.9, so in addition to the ordered symptom frequencies (1×RPM, 2×RPM etc.), a non-ordered symptom frequency associated with the inner race of machine 1 is 5.9×3500 RPM or a frequency of 344.17 Hz. Using the data in the equipment datasheet dataset 220, non-ordered symptom frequencies for various components of each of the machines in the installation can be calculated by OCMS 100.

The second aspect of the vibration feature extraction sub-process of the present invention (step 320) is symptom level extraction. The extraction of the symptom level at ordered frequencies itself involves two steps: the first step calls for enhancing the harmonic contents of the signal over the noise by "coherent averaging", and the second step is to apply a DFT (Discrete Fourier Transform) on the averaged signal to compute the symptom level. The results of those two steps provides the vibration levels for the particular machine at the ordered frequencies of 1×RPM, 2×RPM, 3×RPM, etc.

The "coherent averaging" aspect is an approximation of the "synchronized averaging" of the vibration signal which would be obtained if a synchronized sampling were to be performed with an actual speed Sensor such as a tachometer. If the original vibration signal is represented by a discrete sequence x(n) where n=0, 1, 2 . . . N−1 and N is the total number of the samples, then the averaged signal is given by $$\bar{x}(i) = \frac{1}{M}\sum_{j=0}^{M-1} x(i + jP) \quad (4)$$

where i=0, 1, 2, . . . P−1, and M is the number of averages. The integer P represents the length of a rectangular window in the averaging process in terms of the number of samples within the window. The value of P is chosen such that it satisfies the following relationship:

$$P = \text{INTEGER of } \left[\frac{Lf_s}{f_1}\right] \quad (5)$$

where $f_s$ is the sampling frequency, $f_1$ is equal to RPM/60 or the frequency of the shaft rotation, and the multiplier L is a pre-determined integer that is selected such that the product of L and $f_s/f_1$ is as close to an integer as possible or the length of the rectangular window represented by P is as close to an multiple of the shaft rotation period. The larger L, the larger the window but the smaller number of the averages. Therefore the selection of L is a tradeoff. For long vibration sample or greater N, the value of L can be larger and still provides sufficient number of averages. Otherwise, L can be set to 1.

The averaged signal contains K harmonic or ordered vibration components plus a residual noise, as given by $$\bar{x}(i) = \sum_{k=1}^{K} V_k \cos\left(\frac{\pi}{30f_s}ikRPM + \phi_k\right) + \varepsilon(i) \quad (6)$$

The vibration amplitude, or symptom level, of the k-th order can be computed with the following DFT:

$$V_k = \frac{2}{P}\sqrt{\left(\sum_{i=0}^{P-1}\bar{x}(i)\cos\left(\frac{\pi}{30f_s}ikRPM\right)\right)^2 + \left(\sum_{i=0}^{P-1}\bar{x}(i)\sin\left(\frac{\pi}{30f_s}ikRPM\right)\right)^2} \quad (7)$$

And the phase of the k-th order is $$\tan(\phi_k) = \frac{\sum_{i=0}^{P-1}\bar{x}(i)\sin\left(\frac{\pi}{30f_s}ikRPM\right)}{\sum_{i=0}^{P-1}\bar{x}(i)\cos\left(\frac{\pi}{30f_s}ikRPM\right)} \quad (8)$$

The maximum order that can be computed is K such that the frequency of the K-th order is less or equal to Nyqust frequency (half of the sampling frequency). An alternative approach which may be used to extract the order components is the Vold-Kalman order tracking filtering technique as is known by those of skill in the art.

For non-ordered symptom frequencies, a narrow band filter is used to extract the symptom levels from the residual signal. The residual signal is the original signal modified by removing the order components. The residual signal is derived from the following processing:

$$\varepsilon(i) = x(i) - \sum_{k=1}^{K} V_k \cos\left(\frac{\pi}{30 f_s} ikRPM + \phi_k\right) \quad (9)$$

The narrow band filter is preferably centered at the symptom frequency with a small constant percentage bandwidth. The bandwidth of the filter is selected to ensure that the actual symptom frequency is within range.

Figure 12:
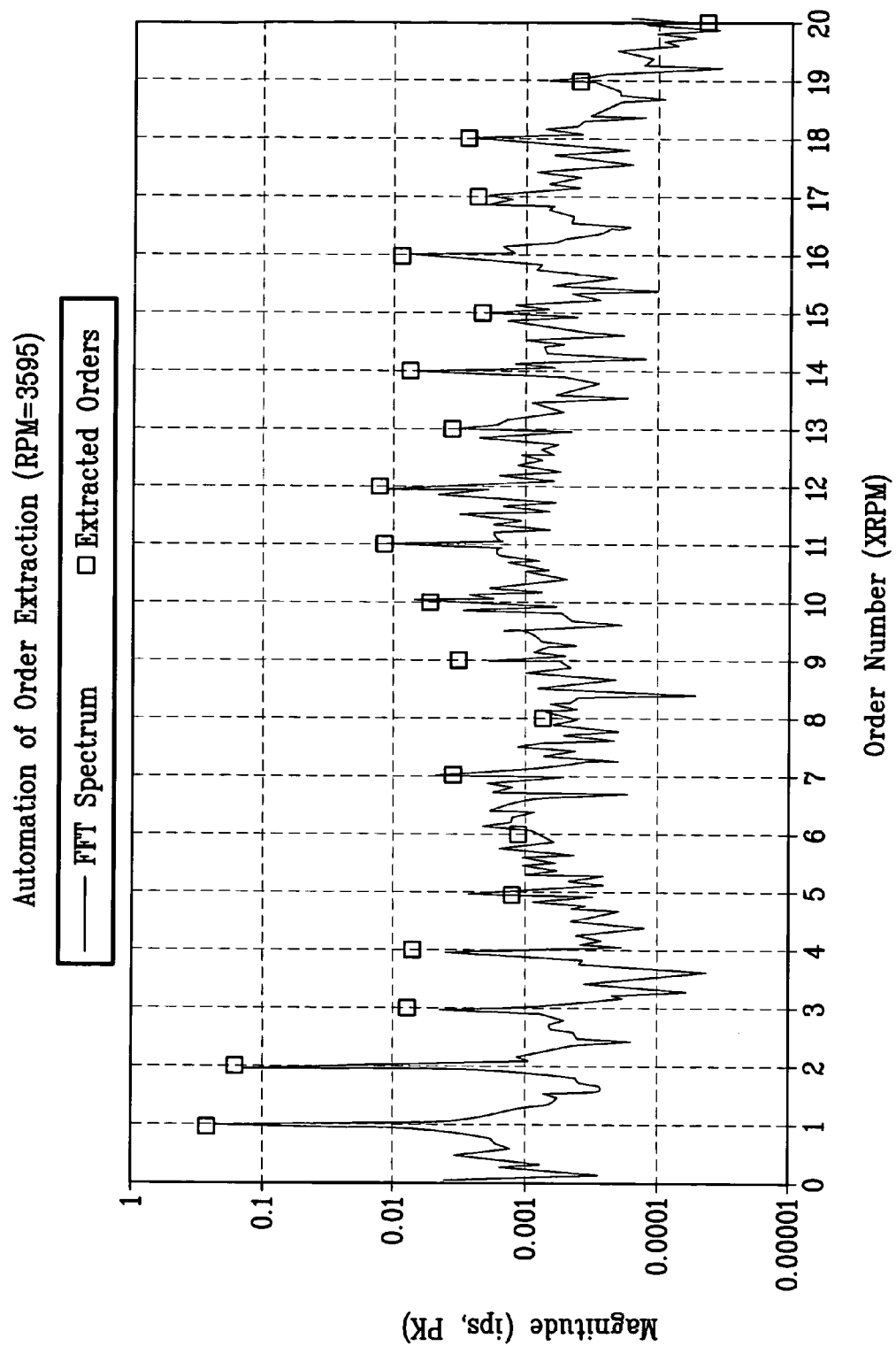
FIG. 12 is a graph illustrating the accuracy of order extraction resulting from the application of the process of the present invention according to a preferred embodiment thereof.

The chart provided in FIG. 12 compares the test data of extracted vibration levels at orders against a detailed FFT spectrum, demonstrating the very good accuracy of the automatic vibration extraction processing of the present invention.

Once vibration features have been extracted as described above, the overall process can continue to provide actual fault detection and diagnosis at step 330 of FIG. 2. After symptom frequencies, symptom levels, and change rate of the symptom levels are determined, the system of the present invention employs a knowledge base and inference engine 230 to perform condition detection and diagnosis with the benefit of current and historic machine conditions. The knowledge base 230 preferably includes the decision-making logic and/or pattern recognition algorithm and/or a rules-based expert system for the specific machine and specific components and related conditions to be monitored. The rule-based expert system contains experts' experience and knowledge on the fault diagnosis of a machine encoded into a set of IF-THEN rules. The system compares the vibration features or symptoms extracted from the vibration feature extraction subsystem 80 against the conditions (IF parts) of the rules and determines which rule to fire and returns the diagnosis. The following example is a simple rule for detection of shaft imbalance:

```
"IF:     (1XRPM_VIBRATION_LEVEL IS ABOVE 1XRPM_NORMAL_LEVEL AND
         2XRPM_VIBRATION_LEVEL IS BELOW 2XRPM_NORMAL_LEVEL AND
         3xRPM_VIBRATION_LEVEL IS BELOW 3XRPM_NORMAL_LEVEL )
THEN:    MACHINE_STATE = SHAFT_IMBALANCE
IF:      (1XRPM_VIBRATION_LEVEL          IS
BELOW IMBALANCE_SEVERITY_HIGH AND
1XRPM_VIBRATION_LEVEL         IS
BELOW IMBALANCE_SEVERITY_MEDIUM)
THEN:    MACHINE_SEVERITY=IMBALANCE_LOW
EXIT"
```

The above example is a crisp rule, though more sophisticated implementations such as fuzz-rules could also be used. Another component in the knowledge base 230 may be the prediction algorithm that performs a trend analysis of historical data and determines the progression rate of the detected faults, and estimates the probability of the remaining time before the fault progress to next alarm stage based on the progression correlation. This aspect may help machine operators plan for machine maintenance.

Figure 13:
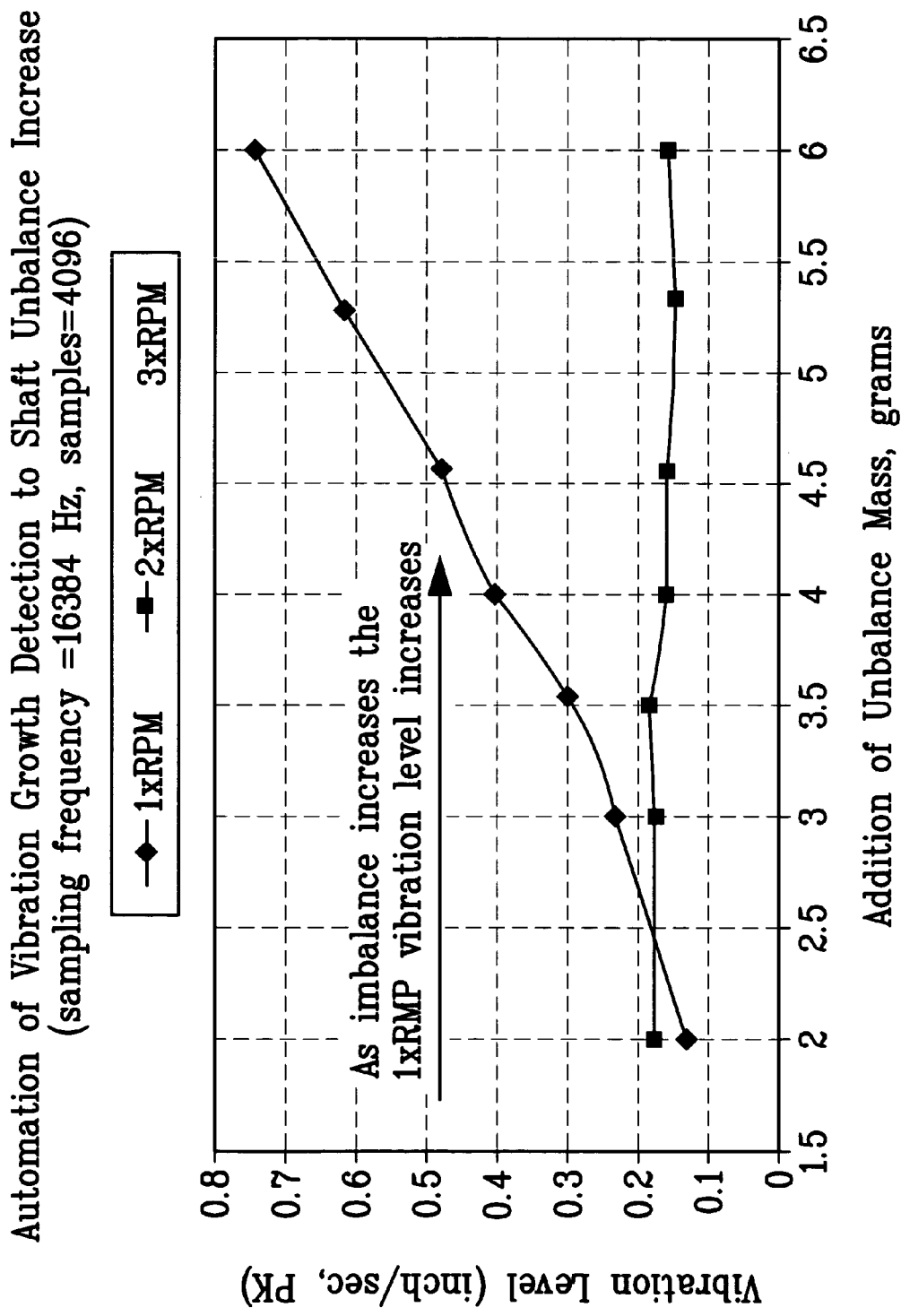
FIG. 13 is a graph illustrating actual change in vibration level due to a fault condition in a machine.

FIG. 13 shows the detection of a lab-simulated machine fault due to a shaft imbalance condition. The chart shows that the dominant vibration is at 1×RPM when the shaft is unbalanced. As the shaft imbalance forces increase, the 1×RPM vibration increases almost linearly while 2×RPM and 3×RPM vibration levels remain relatively low and unchanged. This characteristic of the imbalance vibration is an example of data gathering that may be used to populate equipment datasheet dataset 220 and knowledge base 230. In this example, the rules base would be set up to monitor vibration changes at the 1×RPM frequency in order to monitor the condition of a shaft imbalance for the particular machine.

Fault detection and condition monitoring is preferably undertaken on an ongoing basis or according to a specific schedule as required or desired by the particular installation. At step 340 in FIG. 2, if a fault or out of bounds condition is detected via the methodology described above, OCMS 100 may function in various alternative ways. For example, OCMS 100 may cause an alarm to sound or a message to be displayed on a user interface screen with detailed symptoms and possible root causes. Other actions are also possible either instead of or in addition to the above described actions. For example, in some cases, OCMS 100 may automatically shut one or more machines down based upon specific fault conditions or fault levels.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art

What is claimed is:

1. A method for monitoring machine faults comprising:
   (a) determining one or more base vibration features associated with said machine;
   (b) acquiring time-based vibration data samples from a vibration transducer in physical contact with said machine;
   (c) determining a machine operating speed estimate for said machine using a continuous vibration model;
   (d) acquiring vibration data for said machine occurring at said machine operating speed; and
   (e) determining whether one or more faults exists within said machine based upon a comparison of said base vibration features with said vibration data occurring at said machine operating speed,
   wherein said determining the machine operating speed estimate further comprises:
   (a) selecting a discrete range of operating speeds through which to conduct a search;
   (b) dividing the time-based vibration data sample into a plurality of sub-records of sample lengths;

(c) obtaining the coefficients of a digital comb filter based upon P;

(d) convoluting the time-based vibration data samples using the digital comb filter in the time-domain;

(e) computing the total vibration power and the coherent vibration power, (f) computing a vibration power error function;

(g) selecting the optimal P that minimizes the error function by comparing the error functions of all sub-record lengths within said selected discrete range of operating speeds; and (h) estimating and outputting the machine speed RPM based upon said selected optimal P.

2. The method of claim 1, wherein said determining whether one or more faults exists is reported to an operator on a periodic basis.

3. The method of claim 1, wherein said machine operating speed is reported to an operator on a periodic basis.

4. The method of claim 1, wherein said base vibration features comprise vibration features at a plurality of machine operating speeds.

5. The method of claim 4 wherein said determining whether one or more faults exists comprises a comparison of base vibration features against vibration data at a plurality of machine operating speeds.

6. The method of claim 1, wherein said determining one or more base features associated with a machine further comprises determining symptom frequencies and symptom levels associated with said machine.

7. The method of claim 1 wherein said determining the machine operating speed estimate further comprises:

(i) selecting a machine speed step length for searching RPM;

(j) selecting a search range of machine speed based on the result of an optimal P obtained through the said estimating step;

(k) using a continuous vibration model of K's vibration harmonics to represent the coherent vibration, in which each hannonic is a vibration component with a frequency as a multiple of RPM, and the number of harmonics are selected to include all possible vibration components in the filtered vibration samples to be processed;

(l) using a DFT to obtain the coefficients of said continuous vibration model from the filtered time-based vibration data samples;

(m) computing the coherent vibration power from said continuous vibration model;

(n) computing the error function; and (o) obtaining a machine operating speed measurement that minimizes the cost function.

8. The method of claim 1 further comprising:
measuring the degree of machine fault symptoms based upon said extracted vibration features and said time-based vibration data samples.

9. The method of claim 8 further comprising:
performing condition diagnosis for said machine based upon said degree of machine fault symptoms.

10. The method of claim 8 wherein said vibration data is measured at ordered multiples of machine RPM.

11. The method of claim 8 wherein said vibration data is measured at non-ordered multiples of machine RPM.

12. The method of claim 8 wherein said monitored machine fault is a shaft imbalance.

13. The method of claim 8 wherein said monitored machine fault is a bearing problem.

14. A system for detecting faults within a machine comprising:

means for determining one or more base vibration features associated with said machine;

means for acquiring time-based vibration data samples from a vibration transducer in physical contact with said machine;

means for determining a machine operating speed estimate for said machine using a continuous vibration model;

means for acquiring vibration data for said machine occurring at said machine operating speed; and means for determining whether one or more faults exists within said machine based upon a comparison of said base vibration features with said vibration data occurring at said machine operating speed, wherein said means for determining a machine operating speed comprises:

(a) means for selecting a discrete range of operating speeds through which to conduct a search;

(b) means for dividing said time-based vibration data sample into a plurality of sub-records of sample length P;

(c) means for obtaining the coefficients of a digital comb filter based upon P;

(d) means for convoluting the time-based vibration data samples using the digital comb filter in the time-domain;

(e) means for computing the total vibration power and the coherent vibration power;

(f) means for computing a vibration power error function;

(g) means for selecting the optimal P that minimizes the error function by comparing the error functions of all sub-record lengths within said selected discrete range of operating speeds; and (h) means for estimating the machine speed RPM based upon said selected optimal P.

15. The system of claim 14, wherein said detected faults are reported to an operator on a periodic basis.

16. The system of claim 14, wherein said machine speed is reported to an operator on a periodic basis.

17. The system of claim 14, wherein said base vibration features comprise vibration features at a plurality of machine speeds.

18. The system of claim 14, wherein said machine is shut down in the presence of one or more detected faults.

* * * * *